(12) United States Patent
Waxman et al.

(10) Patent No.: US 9,167,085 B2
(45) Date of Patent: Oct. 20, 2015

(54) SYSTEM AND METHOD FOR COORDINATED CALL-BACK REVOCATION

(71) Applicant: Avaya Inc., Basking Ridge, NJ (US)

(72) Inventors: Harvey Waxman, Holmdel, NJ (US); John H. Yoakum, Cary, NC (US); Gordon Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/040,786

(22) Filed: Sep. 30, 2013

(65) Prior Publication Data

US 2015/0092934 A1 Apr. 2, 2015

(51) Int. Cl.
*H04M 3/42* (2006.01)
*H04M 3/48* (2006.01)

(52) U.S. Cl.
CPC ............ *H04M 3/42195* (2013.01); *H04M 3/48* (2013.01)

(58) Field of Classification Search
CPC ........................... H04M 3/42195; H04M 3/48
USPC ............. 379/210.01, 201.01, 210.02, 211.01; 719/315
See application file for complete search history.

(56) References Cited

U.S. PATENT DOCUMENTS

| 7,412,043 | B2 * | 8/2008 | Horvath et al. | 379/201.01 |
| 8,077,849 | B2 * | 12/2011 | Altberg et al. | 379/201.01 |
| 8,327,383 | B2 * | 12/2012 | Liddell et al. | 719/315 |
| 2010/0272245 | A1 | 10/2010 | Brunson | |

* cited by examiner

*Primary Examiner* — Thjuan K Addy
(74) *Attorney, Agent, or Firm* — Maldjian Law Group LLC

(57) ABSTRACT

System and method to revoke call-back requests, the method including: transmitting a plurality of communication requests from a caller to one or more callees; determining mootness of a request for a call-back from at least some of the callees; initiating, by use of a single command, a plurality of call-back cancellation requests to the at least some of the callees; and transmitting one or more call-back cancellation requests to the at least some of the callees. The method may further include determining a characteristic shared by the communication requests to the at least some of the callees. Determining a characteristic may include determining subject matter from message content, metadata, or sending time of the communication requests. The request for a call-back is determined by the caller or inferred by a callee. Call-back cancellation may include removal of a call indication from a notification list of the callee.

20 Claims, 2 Drawing Sheets

200

SYSTEM AND METHOD FOR COORDINATED CALL-BACK REVOCATION

BACKGROUND

1. Field of the Invention

Embodiments of the present invention generally relate to call-back requests, and, in particular, to a system and method for revoking multiple call-back requests in a coordinated manner.

2. Description of Related Art

Throughout a day, a caller (also referred to as a calling party) may make numerous attempts to call or establish sessions with a callee (also referred to as a called party). If a caller cannot immediately reach a first callee, the caller may call and attempt to reach a second callee. The second callee may also be unavailable, and this process may repeat.

If a called party is not available to accept an incoming request, many current communication systems often leave an indication that a call was missed and provide an easy means of returning the call. For example, browser-based systems based on Web Real-Time Communications ("WebRTC"), as developed by the World Wide Web Consortium ("W3C") and the Internet Engineering Task Force ("IETF"), often provide a popup message notification and create a readily accessible return communication notification list. Traditional phone systems may provide a missed communication notification list that can be used to see who called and to return missed calls. Even if the caller did not leave a message with an explicit request for a call-back, the callee may treat the entry in the missed communication notification list as an implicit request to call back.

However, after some period of time, the need to return the call may no longer exist, or the original calling party may know that they will not be available to accept a return call (e.g., it is after close of business, or the original caller is in a meeting). However, the original callee may be unaware that the need to return the call has passed and may return the original call. The cycle may repeat, and the returned calls create an unnecessary game of "telephone tag."

Traditional systems provide an explicit "leave word calling" feature with an explicit ability to cancel a single outstanding leave word calling request. Likewise, similar revocation notions exist for a single email message sent to one or more parties. However, if there is a series of back-and-forth messages (e.g., calls and call-backs), or single calls to multiple callees, each of the leave word calling requests must be cancelled individually in order to avoid unnecessary call-backs. There is no known method or system to cancel or revoke a series of related leave word calling requests.

Therefore, a need exists to avoid unnecessary returned calls, in order to avoid wasted time and effort, and ultimately improved customer satisfaction.

SUMMARY

System and method to revoke call-back requests, the method including: transmitting a plurality of communication requests from a caller to one or more callees; determining mootness of a request for a call-back from at least some of the callees; determining a characteristic shared by the communication requests to at least some of the callees; and transmitting a single call-back cancellation request to at least some of the callees. The characteristic may include subject matter from message content or metadata of the communication requests, or a characteristic shared with a call to a callee who provided a call-back to the caller. The request for a call-back is determined by the caller or inferred by a callee. The call-back cancellation may include removal of a call indication from a notification list of the callee or transmitting an indicator by the caller to the callee and displayed to the callee.

A system in accordance with an embodiment of the present disclosure may include system to revoke call-back requests, including: a transmitter configured to transmit a plurality of communication requests from a caller to one or more callees; a processor coupled to a memory, the processor configured: to determine mootness of a request for a call-back from at least some of the callees; to initiate, by use of a single command, a plurality of call-back cancellation requests to the at least some of the callees; and to transmit one or more call-back cancellation requests to the at least some of the callees.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
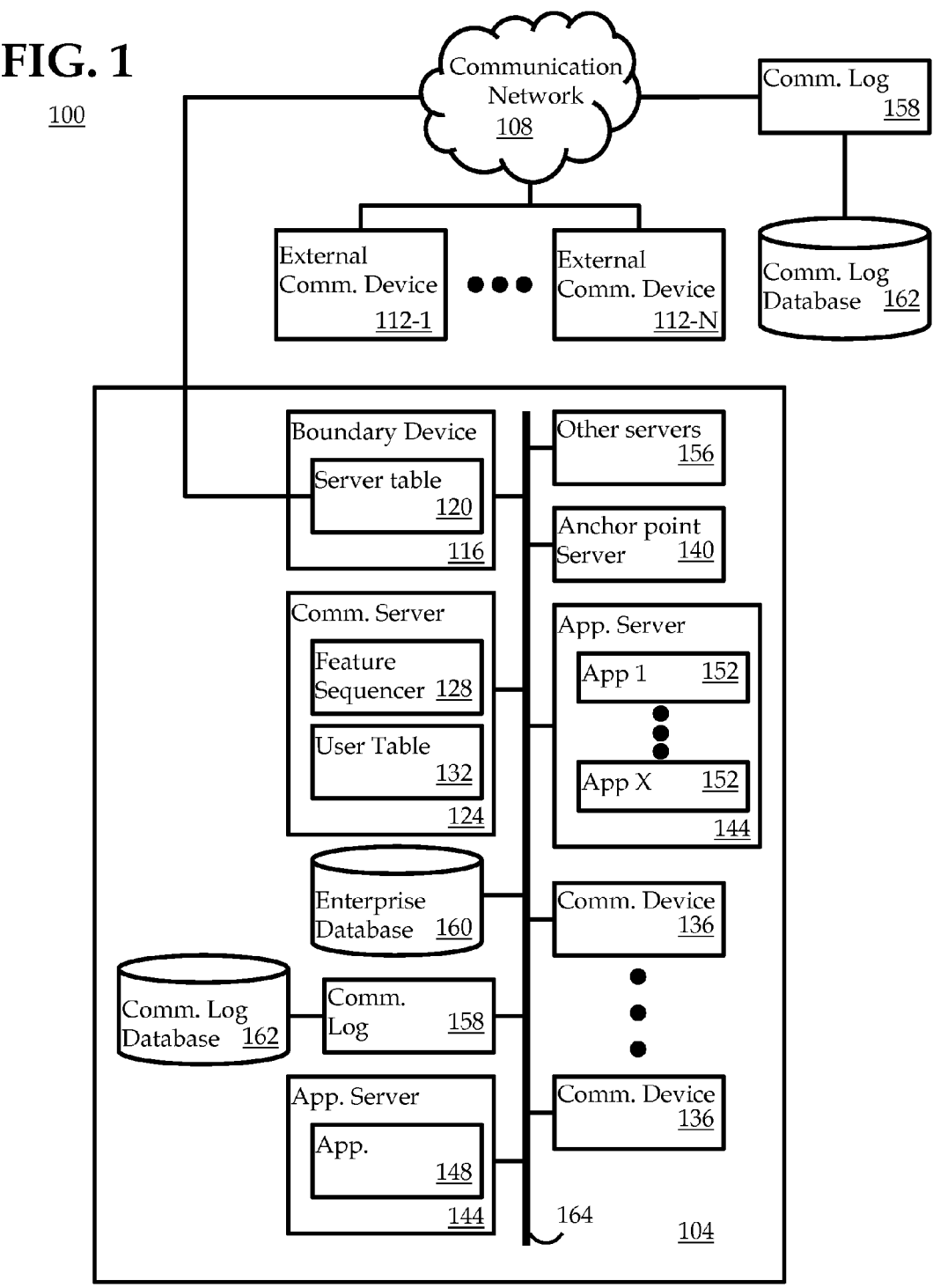
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize notifications that a call-back is not needed or no longer needed.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth, that includes information such as data or a command.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize WebRTC as a communication architecture to establish media flows. Systems that use WebRTC allow for media flows, notices, and other communications across web-based communication systems, allowing for usage of diverse communication systems, communication end terminals, computing protocols and communication protocols that may be usable for web-based communication.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples are phones, desktop multimedia clients, instant message accounts, email accounts and so on. The SIP framework is responsible for routing a request for a peer-to-peer session addressed to a given URL to one or more appropriate contacts for that URL. The framework may utilize information about the preferences, presence and location of the user identified by the URL, to determine the most appropriate contacts. The protocol also provides mechanisms to specify the type of session that is requested as well as means to change session parameters.

SIP is not a vertically integrated communications system. SIP is rather a component that can be used with other IETF protocols to build a complete multimedia architecture. Typically, these architectures will include protocols such as RTP (RFC 3550) for transporting real-time data and providing QoS feedback, the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users.

However, the basic functionality and operation of SIP does not depend on any of these protocols.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112-1 . . . 112-N, where N is an integer, N≥1. A single but unspecified external communication device may be referred to as external communication device 112-n, or simply as external communication device 112. The external communication device(s) 112 are generally referred to as "external" because they are either not under the direct control of the enterprise administering the enterprise network 104 or have a decreased level of trust with the enterprise network 104 as compared with communication devices 136 that are within the enterprise network 104. Exemplary types of external communication devices 112 include, without limitation, cellular phones, laptops, Personal Computers (PCs), Personal Digital Assistants (PDAs), digital phones, analog phones, and the like.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In accordance with at least some embodiments of the present invention, the mapping of user identities within a communication request does not necessarily have to occur at the network boundary device 116. For instance, the mapping between an authoritative server and a user may occur "behind" the network boundary device 116 within the enterprise network 104.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 may include a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 may provide communication features directly into the communication session or the feature sequencer 128 can determine an application sequence which will be invoked during set-up for both outgoing and incoming processing and used during the communication session. Elements of enterprise networks 104 may be configured to intercept call-backs from a callee corresponding to call-back requests that had been cancelled by the caller.

In some embodiments, if a caller attempted but was unable to communicate a revocation to a callee, then a call-back from the callee is an unwanted call-back. The caller may invoke a screening process or application program that is sequenced upon termination of incoming calls. Using the screening process, if an unwanted call-back is received by a caller, an automated message initially may be sent to the callee in order to indicate that a need for a call-back no longer exists. The callee may then choose either to terminate the call-back, or to indicate a continued need to contact the caller, for example to discuss another topic. Such capability may be provided by a sequenced app.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication notification list service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

For ease of reference, embodiments herein may describe communications or attempted communications between parties as being "calls" from a caller to a callee. However, embodiments herein are not limited to voice calls. Instead, unless clearly stated or plainly evident from the surrounding context, "calls" may include other forms of communications such as video calls, emails, instant messages, SMS text messages, etc. A caller will be an originator of such a communication, and a callee will be a recipient of such a communication. Either or both of the caller and callee may use an external communication terminal 112-$n$ illustrated in FIG. 1. External communication terminal 112-$n$ may include substantially any type of communication device that is suitable for bidirectional voice, video or text communications. Examples of communication terminal 112-$n$ may include a smart phone, a notebook computer, a tablet computer, a netbook computer, other small computing devices, desktop computer, a workstation computer, a server or a media player console.

In an exemplary scenario in which embodiments may operate, a caller may have an urgent or persistent need to communicate some information, e.g., to find out some information or to inform another party of some information. Often, the need to communicate is tied to some other event, or is otherwise time-sensitive, or may be satisfied by one member of a group of persons. Other scenarios may be envisioned in which the need to communicate with a specific callee is conditional and/or transitory, instead of or in addition to the examples presented. When the status of the other event changes, or if the time at which the information is needed has passed, or if one person of the group provides the needed information, then the need to communicate may change or become moot. For example, if the need to communicate is in order to gather information in preparation for a status meeting, the need for that information may become moot after the meeting has concluded. Or in another example, if a person is planning to meet a group of friends socially and only knows when they plan to meet but not exactly where to meet, the person may try to contact each member of the group until either he finds out the place to meet or until it becomes too late to meet his friends even if he found out where they are meeting. Once either of those events occurs, the need for that information is moot.

A call may have an associated call-back request. A call-back request may be explicit. For example, a missed call may cause the caller to leave a message asking that the callee to call back. Or, the caller may invoke a system feature that allows the caller to provide an indication to the callee that a call back is requested. Such a feature may be invoked by, e.g., a DTMF key press before hanging up. Such a system feature may be provided at least in part by a server such as server 144 or feature sequencer 128 of FIG. 1.

In the case of notification systems based on WebRTC, there is no specific communication terminal. Instead, a general purpose browser handles both notifications and media flows. As used herein, a communication may include a browser window running WebRTC.

A call-back request may also be implicit, or inferred by a callee. A missed incoming call or other attempted communication is often noted by the callee's communication terminal, and a notice of a missed call (e.g., a pop-up window) or list of missed calls (e.g., a communication notification list) may be made available to the callee and/or displayed to the callee. An indication that a call or other interactive communications attempt was missed may create an implied call-back request.

Embodiments in accordance with the present invention provide a method and system for a caller to easily revoke one or more related call back requests. The call-back requests may be either explicit or implicit.

Embodiments in accordance with the present disclosure may provide a method, apparatus and/or system to keep a list of all implicit and explicitly revocable calls on a per-caller or per-callee basis, along with specific attributes for each call. A user interface or a programmatic interface may provide a method and/or system to specify what group of calls, based on a time-based criterion (e.g., when the call was placed) or based on matching some call attribute (e.g. subject) or call content, should have their associated call-back requests revoked. A message may be sent to each affected called party to remove a call-back request and/or indicate that no callback is required.

A user interface in accordance with an embodiment of the present disclosure may provide a single command interface in order to make it more convenient for a caller to revoke multiple call-back requests. The single command is part of user interface, and not a part of the messaging that occurs as a result of the user interface. For a series of messages that are sent from the calling party to each of the called parties having callbacks revoked, the user interface for setting up and invoking the series of messages is usable with substantially any type of messaging used for data communications, including proprietary messages and/or extensions to an existing standard such as SIP.

In order to treat a group of call-back requests as being related, for the purpose of selecting them as a group for revocation or other handling with a single command, the call-back requests should share a characteristic that can be used to select which call-back requests to revoke or otherwise handle. For example, call-back requests may be revoked based upon the time at which the caller called or made a request for a call-back. Time-based grouping may be useful if, for example, the caller had spent a block of time attending to one activity, e.g., half an hour before a meeting to calling several people to learn status of a project before a meeting, or ten minutes calling friends to find out where they were planning to meet. In another example, at the end of the work day a caller may decide to cancel all call-back requests made during the morning or during the entire day. Or at lunchtime, a caller may decide to cancel call-back requests made during the previous day's afternoon. Or after a meeting, a caller may decide to cancel all call-back requests prior to the meeting, regardless of the purpose of the calls. An end of day sign-off sequence may include a request to cancel all call-backs. Other time-based scenarios may be contemplated.

In another embodiment, selecting which call-back requests may be revoked should be based upon the content of the message or communication. For example, a text message that says "HMU—need to discuss client ABC meeting" may cause a search for other calls that mention client ABC. If the communication was text-based at least in part (e.g., an email, instant message, SMS text message, topic header included in the origination of a voice or video based session, etc.), the content extraction may include keyword extraction and recognition, or other methods of interpretation of meaning. A system based on WebRTC may send a text header to provide context for the request to start a voice or video call. A WebRTC text header may be left as part of a call back request that later may be revoked.

If the communication was not text-based (e.g., a voice mail or video mail), a speech recognition process may be used to recognize the content, and in turn methods such as keyword extraction and recognition may proceed as in the case of text-based communications. Related communications may be illustrated for selection purposes as message threads.

In another embodiment, the caller may provide one or more relevant keywords or topics when calling and/or leaving a call-back request. Certain information such as caller-provided relevant keywords or topics may be stored as metadata, and the metadata may be searched for other calls related to the same or similar information, similarly to the searching of the message content itself, for identification of related calls. For example, a "subject" metadata field such as used in SIP may be provided, the contents of which may be used to identify related calls.

If a call-back in fact takes place, and is answered or received by the original caller, some embodiments may identify other related call-back requests, e.g., other call-back requests to the same callee, or call-back requests to other callees regarding the same topic, or call-back request within a configurable amount of time before or after the call-back request to the caller who in fact called back, and so forth. Calls may be recognized as being related to a shared topic by methods discussed herein, including analysis of the information content of the messages and/or of metadata related to the messages. Such embodiments may rely upon caller approval to cancel the identified call-back requests.

In another embodiment, the caller may be presented a list of calls and/or call-back requests made but not yet fulfilled during a specified time period (e.g., during the last 24 hours), and the caller will be able to select those call-back requests to cancel with a single command. Selection may be made by familiar methods such as a series of checkboxes, or highlighting one or more call-back requests followed by pressing the "Delete" key, or dragging and dropping to a Trash icon, and so forth. Such a method may rely more heavily upon a final identification by the caller of related messages for which any associated call-back requests that should cancelled. The processes described herein may provide recommendations to the caller regarding call-back requests that may be related and/or should be cancelled together, with the caller providing the final authorization to cancel a call-back request.

In some embodiments, if a call-back request is cancelled for a particular call, an entry in the callee's incoming communication notification list may be preserved for the call whose call-back request was cancelled, but a separate indication may be added to the entry in order to indicate to the callee that the caller has cancelled a request for a call-back and/or that no call-back is needed or desired. In some embodiments, the callee's incoming communication notification list may be stored on the callee's communication terminal and managed by the callee or the callee's communication terminal. In other embodiments, the callee's incoming communication notification list may be stored on a server managed by the server. Management may include display of the log or portions of the log, selecting portions for display or further operations, associating incoming calls with call-back requests, and so forth.

In some embodiments, a call may be addressed to a group address (e.g., team XYZ), or a group of individually identified members (e.g., members "A", "B" and "D", etc.). Such a scenario may be useful if the needed information can be provided by any one of the addressees (e.g., "where are we meeting?"). Calls may be made sequentially to the callees until one provides the needed information either during the call or by call-back. Once the caller receives the needed information, the group address or group of individually identified members provides with relatively high confidence an identification of related calls for which call-back requests may be cancelled.

In some embodiments, the callee may be provided an option to enable or disable automatic cancellation of call-back requests or notifications of call-back requests from the caller. For example, if the call-back request notification is in the form of a separate indicator, e.g., a highlight that a callee may see in their incoming communication notification list (including other forms of notification), then automatic cancellation may include removal of the highlight. The callee may be provided an option to override automatic cancellation of notification of any call-back requests. Such an option may be useful to callees who may believe that automatic modification or cancellation of notifications on their incoming communication notification list may be too intrusive, or who may still want to know who called them even if there is no need to return the call to the callee.

In some embodiments, after a request to change or cancel a call-back request is generated by a caller's telecommunications terminal, the management of call-back requests seen by the callee may be managed by the callee's telecommunications terminal. In some embodiments, management of call-back requests seen by the callee may be managed by an intermediate system such as a server, PBX, or the like, and the result of the management may be displayed at the callee's telecommunications terminal.

Embodiments described herein provide a simple process and system for a caller to provide an indication to multiple callees that a return call is no longer required. The indication may be related to multiple events and/or depend upon more complex decision logic. Furthermore, the indication does not necessarily involve retracting or recalling message content, but instead may add to the content by including an explicit indication that no call-back is requested. Embodiments may provide an ability to revoke a group of outstanding communications attempts based on time or attribute groupings, in order to avoid unnecessary call-back attempts.

Figure 2:
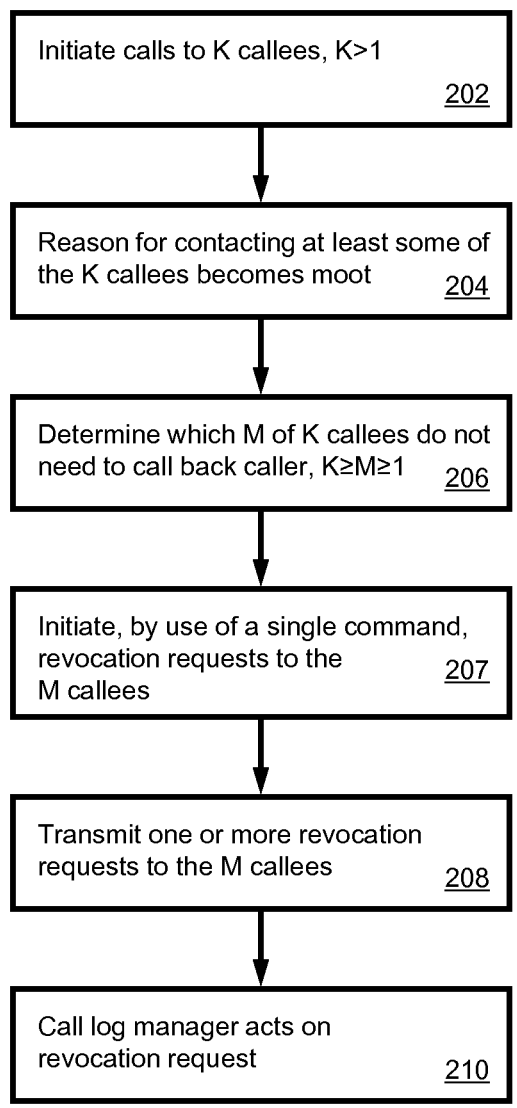
FIG. 2 illustrates at a high level of abstraction a method in accordance with an embodiment of the present invention.

FIG. 2 illustrates at a high level of abstraction a process 200, in accordance with an embodiment of the invention. Process 200 may be performed at a calling terminal. Process 200 begins at step 202, at which the calling terminal initiates calls to K callee terminals.

Next control of process 200 transitions to step 204, at which the reason for contacting at least some of the K callees has become moot, for reasons previously described. For example, one of the callees may have provided needed information, or it may be past a predetermined time such as close of business or a meeting time.

Next control of process 200 transitions to step 206, at which a shared characteristic of M callees who do not need to call back may be determined. For example, the shared characteristic may be that they were called in order to discuss the same topic, or they may share one or more keywords in metadata, or the M callees may have been called within a predetermined time of each other, or called before a predetermined time, and so forth.

Next control of process 200 transitions to step 207, which by use of a single command, revocation requests to the M callees may be initiated. For example, a user interface may be provided to allow a caller to select one or more express or implied call-back requests for revocation. Selection may including selecting a group based upon a shared characteristic of the group (e.g., all call-back requests associated with project "ABC"; all call-back requests associated with calls made before 12 noon, etc.), or may include selection of call-back requests associated with individual calls, and so forth. For example, the caller may determine that not all of the call-back requests to the M callees should be revoked. For example, the caller may prefer that some of the callees should call back to discuss additional matters. An interface may be provided to accept an indication from the caller regarding which call-back requests should be revoked. During selection, the call-back revocation request is not necessarily sent. However, after all of the desired selections are made, the actual sending of call-back revocation requests may be initiated by a single action by the caller (e.g., a single command button).

Next control of process 200 transitions to step 208, at which one or more call revocation requests is transmitted to at least some of the M callees. In some embodiments, the mapping of a single command to initiate call-back revocation requests into the sending of multiple call-back revocation requests may take place within the caller's communication terminal. In other embodiments, the mapping of a single command to initiate call-back revocation requests into the sending of multiple call-back revocation requests may take place within a server, a notification repository, or other intermediate network element located between the caller and the callee.

In some embodiments of step 208, in which communication notification lists may be kept on a server and in which notification management is server-based, the server may manage call-back requests such that the server may display to the callee a list of call-back requests. If a call-back request for a call is later revoked by the caller before the callee successfully calls back, the server may delete or suppress the call-back request within the server, such that no call-back request for the call is displayed to the callee. Suppressing a call-back request, as opposed to deleting a call-back request, allows for the call-back request to be restored at a later time.

In other embodiments, the callee or the callee's terminal may manage an incoming communication notification list and call-back revocation requests, such that the callee's terminal may formulate and display to the callee a list of incoming calls and/or call-back requests.

Next, at step 210, the manager of call-back requests (e.g., a server for server-based management, or a callee's terminal for callee-based management) will act upon call-back revocation requests as described above. This may include whether to accept or override the revocation request, how such revoked requests may be presented to the user, and so forth.

Embodiments of the present invention include a system having one or more processing units coupled to one or more memories. The one or more memories may be configured to store software that, when executed by the one or more processing unit, allows practice of the embodiments described herein, at least by use of processes described herein, including at least in FIG. 2, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method to revoke call-back requests transmitted from a caller to one or more callees, comprising:
    transmitting a plurality of communication requests from the caller to the one or more callees;
    determining mootness of a request for a call-back from at least some of the callees;
    initiating, by use of a single command, a plurality of call-back cancellation requests to the at least some of the callees, wherein the plurality of call-back cancellation requests may be clubbed together to form a group sharing a common characteristic that may be used by the caller to select which call-back request to revoke or to handle otherwise; and
    transmitting one or more call-back cancellation requests to the at least some of the callees and may also invoking a screening process to determine any unwanted incoming call in case of a failure to communicate the call-back cancellation requests.

2. The method of claim 1, further comprising determining a characteristic shared by the communication requests to the at least some of the callees.

3. The method of claim 2, wherein determining a characteristic comprises determining subject matter from message content of the communication requests.

4. The method of claim 2, wherein determining a characteristic comprises determining subject matter from metadata of the communication requests.

5. The method of claim 2, wherein determining a characteristic comprises determining a sending time of the communication requests.

6. The method of claim 2, wherein determining a characteristic comprises determining a characteristic shared with a call to a callee who provided a call-back to the caller.

7. The method of claim 1, wherein the request for a call-back is determined by the caller.

8. The method of claim 1, wherein the request for a call-back is inferred by a callee.

9. The method of claim 1, wherein the call-back cancellation comprises removal of a call indication from a notification list of the callee.

10. The method of claim 1, wherein the call-back cancellation comprises an indicator transmitted by the caller to the callee which changes a display to the callee.

11. A system to revoke call-back requests transmitted from a caller to one or more callees, comprising:
    a transmitter configured to transmit a plurality of communication requests from the caller to the one or more callees;
    a processor coupled to a memory, the processor configured to determine mootness of a request for a call-back from at least some of the callees, and to initiate, by use of a single command, a plurality of call-back cancellation requests to the at least some of the callees, wherein the plurality of call-back cancellation requests may be clubbed together to form a group sharing a common characteristic that may be used by the caller to select which call-back request to revoke or to handle otherwise; and
    a transmitter configured to transmit one or more call-back cancellation requests to the at least some of the callees and may also invoke a screening process to determine any unwanted incoming call in case of a failure to communicate the call-back cancellation requests.

12. The system of claim 11, wherein the processor is further configured to determine a characteristic shared by the communication requests to the at least some of the callees.

13. The system of claim 11, wherein the processor is further configured to determine subject matter from message content of the communication requests.

14. The system of claim 11, wherein the processor is further configured to determine subject matter from metadata of the communication requests.

15. The system of claim 11, wherein the processor is further configured to determine a characteristic by determining a sending time of the communication requests.

16. The system of claim 11, wherein the processor is further configured to determine a characteristic by determining a characteristic shared with a call to a callee who provided a call-back to the caller.

17. The system of claim 11, wherein the request for a call-back is determined by the caller.

18. The system of claim 11, wherein the request for a call-back is inferred by a callee.

19. The system of claim 11, wherein the call-back cancellation comprises removal of a call indication from a message log of the callee.

20. The system of claim 11, wherein the call-back cancellation comprises an indicator transmitted by the caller to the callee and displayed to the callee.

* * * * *